(12) United States Patent
Kim et al.

(10) Patent No.: US 8,137,873 B2
(45) Date of Patent: Mar. 20, 2012

(54) COLOR FILTER AND METHOD FOR MANUFACTURING THEREOF

(75) Inventors: Hyun-Sik Kim, Daejeon Metropolitan (KR); Kyung-Soo Choi, Hanam-si (KR)

(73) Assignee: LG Chem, Ltd., Seoul (KR)

( * ) Notice: Subject to any disclaimer, the term of this patent is extended or adjusted under 35 U.S.C. 154(b) by 297 days.

(21) Appl. No.: 12/449,225

(22) PCT Filed: Feb. 1, 2008

(86) PCT No.: PCT/KR2008/000618
§ 371 (c)(1),
(2), (4) Date: Jul. 29, 2009

(87) PCT Pub. No.: WO2008/094010
PCT Pub. Date: Aug. 7, 2008

(65) Prior Publication Data
US 2010/0103548 A1    Apr. 29, 2010

(30) Foreign Application Priority Data

Feb. 2, 2007 (KR) .................. 10-2007-0011022

(51) Int. Cl.
*G02B 5/20* (2006.01)
(52) U.S. Cl. ............................. 430/7; 349/106
(58) Field of Classification Search ........................ None
See application file for complete search history.

(56) References Cited

U.S. PATENT DOCUMENTS

| | | | |
|---|---|---|---|
| 5,888,679 A * | 3/1999 | Suzuki et al. | 430/7 |
| 6,042,974 A * | 3/2000 | Iwata et al. | 430/7 |
| 6,228,435 B1 | 5/2001 | Yoshikawa et al. | |
| 6,399,257 B1 | 6/2002 | Shirota et al. | |
| 6,848,782 B2 | 2/2005 | Okabe et al. | |
| 7,070,890 B2 | 7/2006 | Kiguchi et al. | |
| 2004/0048950 A1 | 3/2004 | Nishida et al. | |
| 2006/0134316 A1 * | 6/2006 | Fitch | 427/66 |
| 2007/0172586 A1 * | 7/2007 | Tachikawa et al. | 427/162 |
| 2009/0061167 A1 | 3/2009 | Nishida et al. | |

FOREIGN PATENT DOCUMENTS

| | | |
|---|---|---|
| JP | 08-292313 A | 11/1996 |
| JP | 09-203803 | 8/1997 |
| JP | 2000-258622 | 9/2000 |
| JP | 2001-272525 | 10/2001 |
| KR | 10-2000-0047958 | 7/2000 |
| KR | 10-2001-0041185 | 5/2001 |
| KR | 1020030028392 A | 4/2003 |
| TW | I247785 B | 1/2006 |
| TW | 200643118 A | 12/2006 |

* cited by examiner

*Primary Examiner* — John A. McPherson
(74) *Attorney, Agent, or Firm* — McKenna Long & Aldridge LLP

(57) ABSTRACT

The present invention relates to a method of manufacturing a color filter and a color filter manufactured by using the same. More particularly, the present invention relates to a method of manufacturing a color filter that includes a) applying a light blocking part material on a substrate; b) prebaking the light blocking part material to form a light blocking layer; c) selectively exposing and developing the light blocking layer to form a light blocking part pattern; d) precuring the light blocking part pattern; e) applying a solution on the substrate on which the light blocking part pattern is formed; f) postbaking the light blocking part and the solution; and g) filling ink in a pixel unit that is defined by the light blocking part pattern, and a color filter manufactured by using the same.

15 Claims, 6 Drawing Sheets

[Fig. 1]
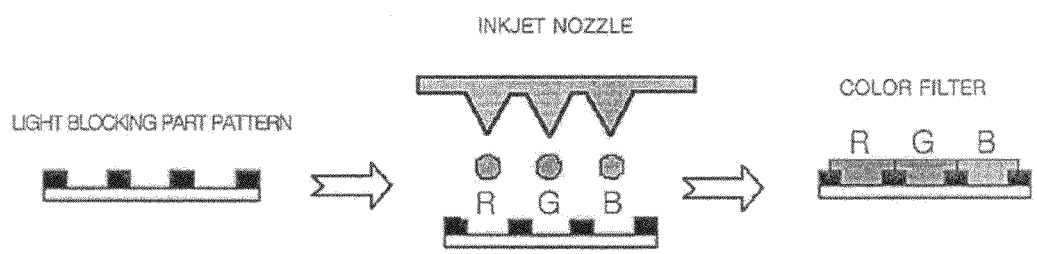
[Fig. 2]
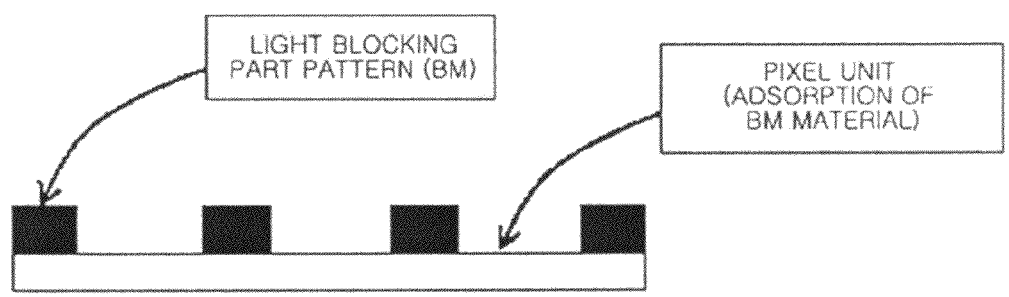

[Fig. 3]
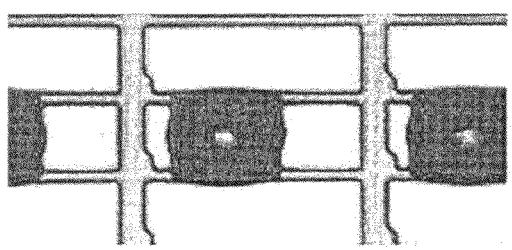
[Fig. 4]
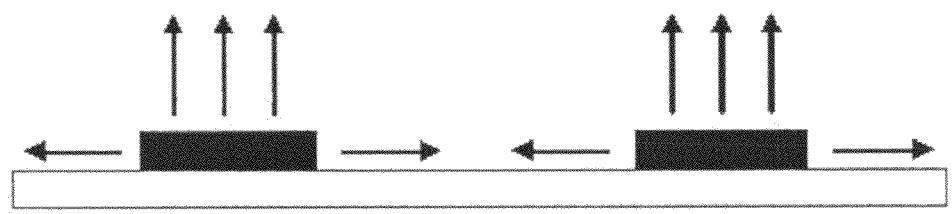

[Fig. 5]
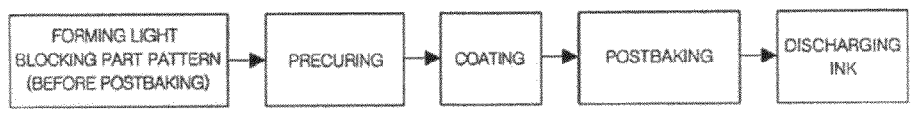
[Fig. 6]
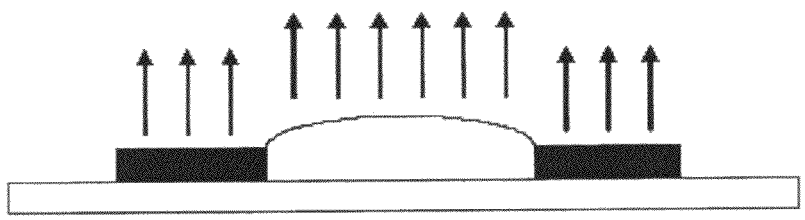

[Fig. 7]
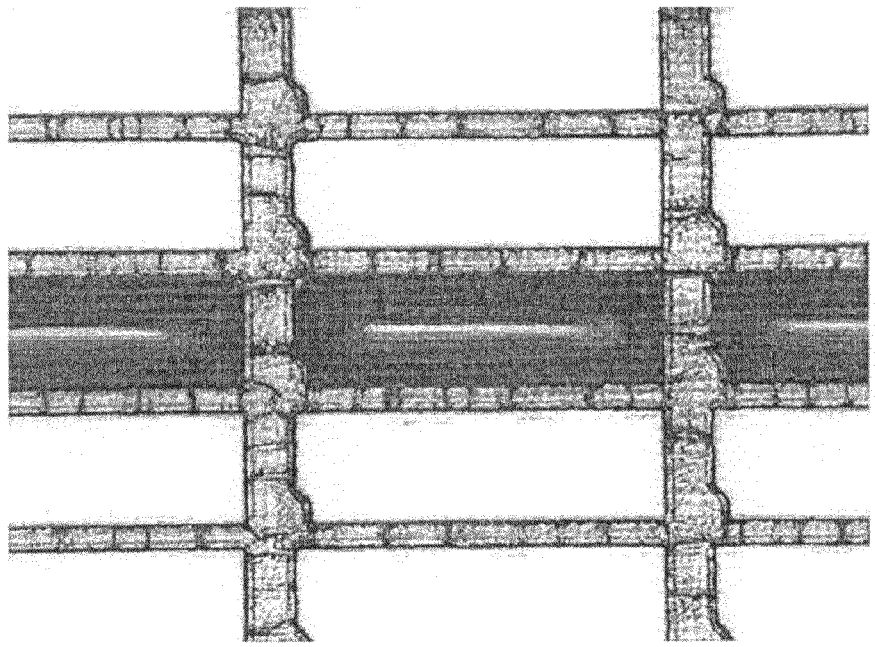
[Fig. 8]
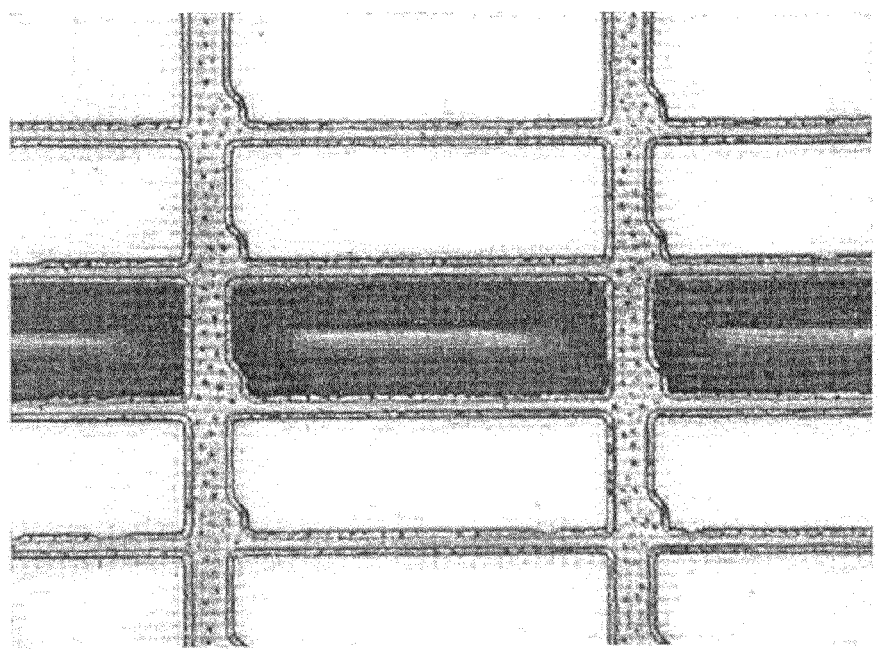

[Fig. 9]
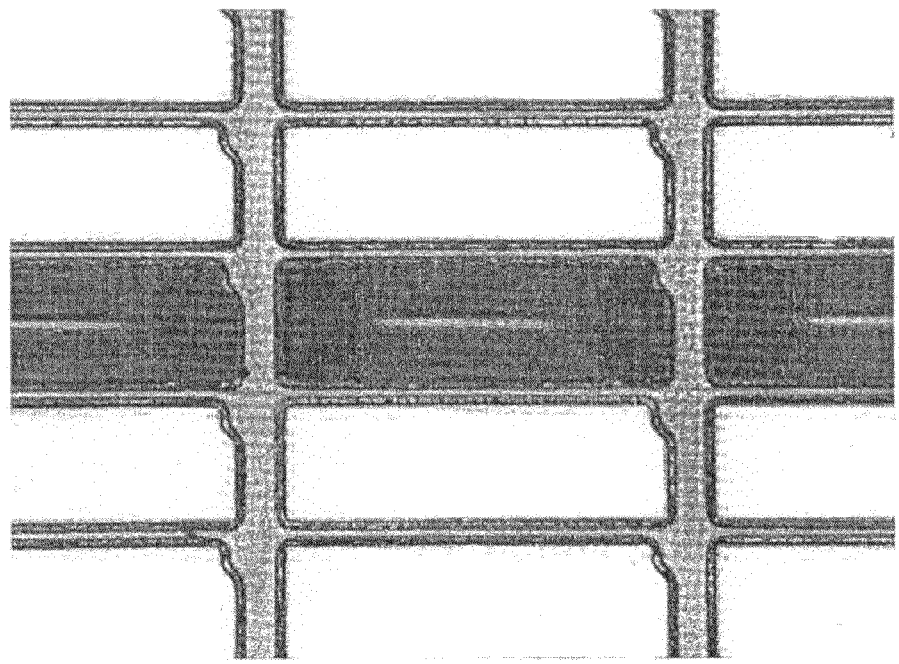
[Fig. 10]
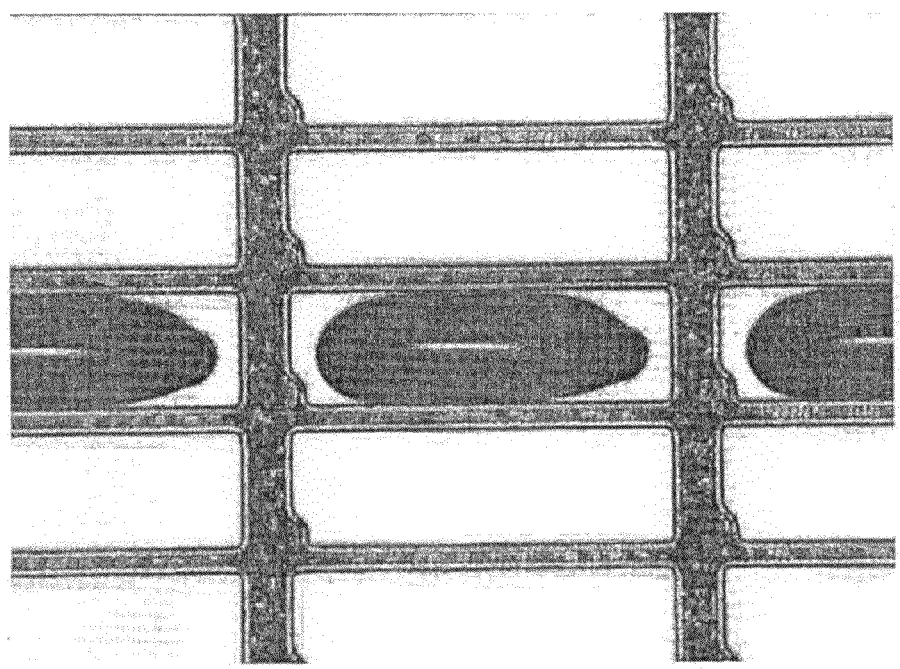

[Fig. 11]
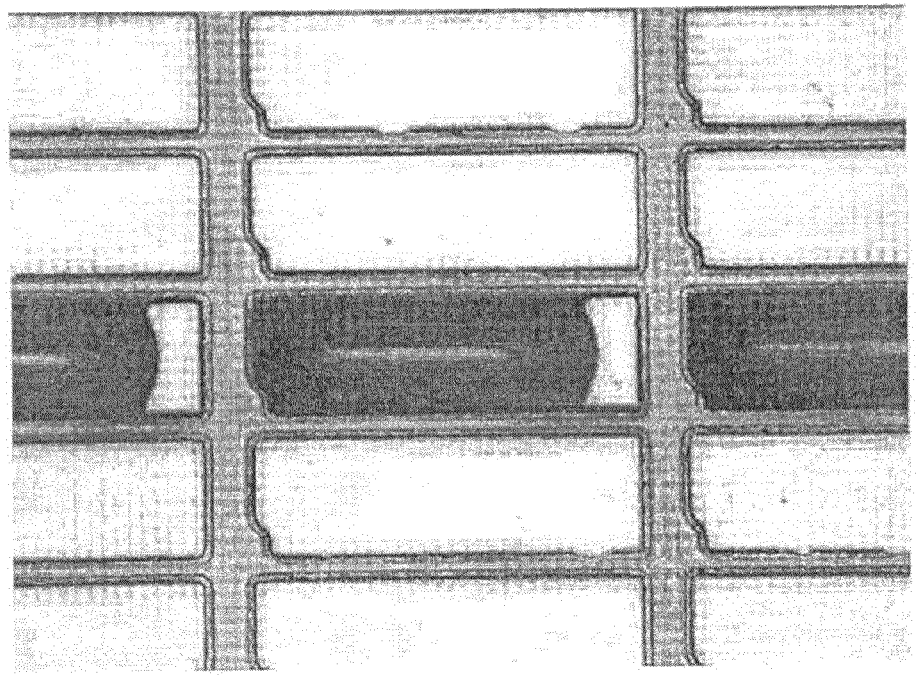
[Fig. 12]
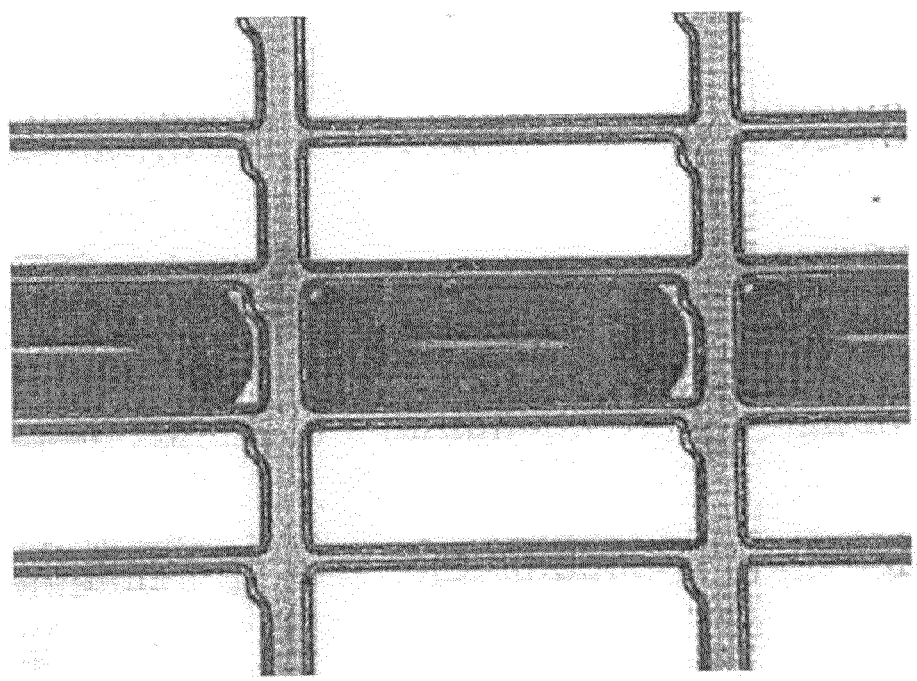

COLOR FILTER AND METHOD FOR MANUFACTURING THEREOF

This application claims the benefit of PCT/KR2008/000618 filed on Feb. 1, 2008, and Korean Patent Application No. 10-2007-0011022 filed on Feb. 2, 2007, both of which are hereby incorporated herein by reference for all purposes in their entirety.

TECHNICAL FIELD

The present invention relates to a method of manufacturing a color filter and a color filter manufactured by using the same. More particularly, the present invention pertains to a method of manufacturing a color filter, in which an ink affinity property of a pixel unit is maintained while a process and complicated surface treatment for forming a separate ink affinity layer are not performed in order to reduce a cost during manufacturing of the color filter by using inkjet, and a color filter manufactured by using the same.

This application claims priority from Korean Patent Application No. 10-2007-0011022 filed on Feb. 2, 2007 in the KIPO, the disclosure of which is incorporated herein by reference in its entirety.

BACKGROUND ART

In general, fine patterns which are used in display devices such as semiconductor circuit devices and LCDs (Liquid Crystal Display) are formed according to a photolithography process by using a photoresist. In connection with this, the photoresist is applied on the substrate, exposed, developed, washed, and cured to produce the fine pattern. Even though the photolithography process is advantageous in that desired patterns are precisely obtained, there are disadvantages in that many steps are performed, various types of materials are used in order to maximize the effect of the photoresist, and a great amount of photoresist is used during processes such as a coating process. In recent, a method for obtaining a fine pattern by using an inkjet printing process has been suggested in order to avoid the disadvantages of the photolithography process.

With respect to the production of the color filter by using the inkjet printing process, a BM (black matrix) which is a light blocking part is formed by using a known photolithography process, and three types of ink having R, G, and B colors are jetted into pixel units between the light blocking parts used as partitions. A manufacturing method of a color filter by using the inkjet printing is shown in FIG. 1. In connection with this, if the light blocking part used as the partition does not have the ink repellency in respects to the ink, the ink which is jetted into the pixel units between the light blocking parts flows through the light blocking part from the pixel unit to the adjacent pixel unit, which may cause color mixing in respects to the same color or the different colors. Therefore, it is required that the light blocking part pattern which is used as the partition during the inkjet printing has the significantly high ink repellency in respects to the ink.

On the other hand, the jetted ink is uniformly spread in the pixel units only when the surface of the glass substrate of the pixel units between the light blocking parts has the low ink repellency in respects to the ink, which prevents light leakage due to unfilling of the pixel units and reduces steps in the pixel unit or between the pixel units. However, if the light blocking part pattern is made of a light blocking part material having the high ink repellency, due to the post-baking process, the surface of the glass substrate of each of the pixel units is reformed so that the surface of each of the pixel units has the ink repellency similar to that of the surface of the light blocking part. Accordingly, even though the ink is jetted, the ink is undesirably spread in each of the pixel units to cause the unfilling and significant steps in the pixel unit or between the pixel units. The light blocking part and the pixel unit that are formed by using the above light blocking part pattern are shown in FIG. 2, and unfilling of ink due to the material having the ink repellency adsorbed on the pixel unit is shown in FIG. 3.

In order to avoid the above-mentioned problems, Japanese Unexamined Patent Application Publication No. 1997-203803 discloses a method of performing surface treatment in respects to a main unit by using an ink affinity treatment agent and surface treatment in respects to a projection unit by using an ink repellency treatment agent. However, this method is problematic in that the treatment is performed by using the ink affinity treatment agent so that the ink repellency treatment agent is not affected or two treatment processes are separately performed by using the ink affinity treatment agent and the ink repellency treatment agent.

Furthermore, Korean Unexamined Patent Application Publication No. 2000-0047958 discloses a color filter which has a wettability-variable layer capable of changing the wettability. However, this method is disadvantageous in that the wettability-variable layer is separately provided in addition to a partition layer which is a light blocking part and an ink layer which is an opening part, thus complicating the production process.

Additionally, Japanese Unexamined Patent Application Publication No. 2000-258622 discloses a method of pattern exposing a photosensitive layer to convert an exposed portion into a hydrophilic portion. However, in this method, it is required that an additional process is performed to form an additional photosensitive layer.

DISCLOSURE

Technical Problem

It is an object of the present invention to provide a method of manufacturing a color filter in which color mixing does not occur in a pixel unit or between pixel units, discoloration due to unfilling does not occur, a surface is uniform, and there is an insignificant step in the pixel unit or between the pixel units by maintaining a hydrophilic property of the pixel unit defined by a light blocking part while an ink repellency property of the light blocking part used as a partition is maintained to improve the spreadability of ink in the pixel unit during manufacturing of the color filter by using an inkjet process, and a color filter manufactured by using the method.

Technical Solution

In order to accomplish the above object, the present invention provides a method of manufacturing a color filter that includes a) applying a light blocking part material on a substrate; b) prebaking the light blocking part material to form a light blocking layer; c) selectively exposing and developing the light blocking layer to form a light blocking part pattern; d) precuring the light blocking part pattern; e) applying a solution on the substrate on which the light blocking part pattern is formed; f) postbaking the light blocking part and the solution; and g) filling ink in a pixel unit that is defined by the light blocking part pattern.

In addition, the present invention provides a color filter that is manufactured by using the above manufacturing method.

In addition, the present invention provides a display device that includes the above color filter.

Advantageous Effects

In the present invention, during manufacturing of a color filter by using an inkjet printing process, a hydrophilic property of the pixel unit between light blocking part patterns is maintained while an ink repellency property of the light blocking part used as a partition is maintained to improve the spreadability of ink in the pixel unit. Thus, it is possible to manufacture a color filter in which color mixing does not occur in the pixel unit or between pixel units, discoloration due to unfilling does not occur, a surface is uniform, and there is an insignificant step in the pixel unit or between the pixel units.

DESCRIPTION OF DRAWINGS

FIG. 1 is a view that illustrates a procedure of manufacturing a color filter by using inkjet printing;

FIG. 2 is a cross sectional view of a patterned substrate;

FIG. 3 is a CCD (Charge-Coupled Device) camera picture (×50) that illustrates unfilling of ink due to a material having the ink repellency adsorbed on a pixel unit;

FIG. 4 is a view that illustrates volatilization of the material having the ink repellency of a light blocking part during a postbake process;

FIG. 5 is a schematic flow chart that illustrates a process of the present invention;

FIG. 6 is a view that illustrates volatilization of the material having the ink repellency of the light blocking part during the postbake process after a solution is applied;

FIGS. 7 to 9 are CCD camera pictures (×50) that illustrate the pixel unit uniformly filled with ink according to Examples 1 to 3 of the present invention; and FIGS. 10 to 12 are CCD camera pictures (×50) that illustrate unfilling of ink in the pixel unit according to Comparative Examples 1 to 3 of the present invention.

BEST MODE

Hereinafter, the present invention will be described in detail.

A method of manufacturing a color filter according to the present invention includes a) applying a light blocking part material on a substrate; b) prebaking the light blocking part material to form a light blocking layer; c) selectively exposing and developing the light blocking layer to form a light blocking part pattern; d) precuring the light blocking part pattern; e) applying a solution on the substrate on which the light blocking part pattern is formed; f) postbaking the light blocking part and the solution; and g) filling a pixel unit that is defined by the light blocking part pattern by using ink.

Specifically, during the process of manufacturing the color filter, when an inkjet process is used, in the case of when the above light blocking part pattern that acts as a partition is formed by using a known photolithography process, the light blocking part material having the ink repellency property is applied on the substrate, and subjected to prebaking, UV exposure, development, and postbaking processes. In particular, during the postbaking process in which the light blocking part material is cured by using heat treatment at high temperatures, the component having the ink repellency property of the light blocking part affects the pixel unit, which enables the pixel unit having the ink affinity property to be reformed to have the ink repellency property. It is deemed that the reformation is caused by the adsorption of the material having the ink repellency property on the pixel unit that is disposed adjacent to the light blocking part pattern in the course of volatilizing the material having the ink repellency property of the light blocking part pattern at a high speed during the postbaking process when the light blocking part pattern is produced. The volatillization of the material having the ink repellency property of the above light blocking part pattern is shown in FIG. 4.

However, in the present invention, in order to prevent the pixel unit from having the ink repellency property before the step of treating the light blocking part pattern by using the postbaking process, the solution having the low volatility is coated on the substrate on which the above light blocking part pattern is formed. In connection with this, in order to prevent the partition of the light blocking part that is not cured from being dissolved due to the coated solution, after the light blocking part is precured, the solution is coated. FIG. 5 is a schematic flow chart that illustrates a process of the present invention.

The above step a is a step in which the light blocking part material is applied on the substrate.

Examples of the substrate include, but are not limited to a glass substrate, a plastic substrate, and a flexible substrate. It is preferable to use a transparent glass substrate having high heat resistance.

The application of the light blocking part material on the above substrate may be performed by using a process which is known in the art, for example, spin coating, dip coating, doctor blading or the like.

It is preferable that the above light blocking part material have the ink repellency property. In order to allow the above light blocking part material to have the ink repellency property, it is preferable that the silicon or fluorine surfactant which is a component having the ink repellency property is contained in an amount of 0.01 to 0.3 parts by weight based on 100 parts by weight of the light blocking part material. In addition, the above light blocking part material may include 20 to 50 parts by weight of carbon black, an organic pigment mixture type light blocking coloring agent, or a hybrid type coloring material containing carbon black and the organic pigment mixture type light blocking coloring agent mixed with each other as a coloring agent, 20 to 50 parts by weight of a binder polymer component, 10 to 40 parts by weight of a crosslinking agent, and additives in respects to the total solid of the composition. Furthermore, the above composition for forming the light blocking part may further include a solvent for a coating property.

The above step b is a step in which the above light blocking part material is prebaked to form the light blocking layer.

It is preferable that the prebaking be performed at 50 to 150° C. for 10 to 1000 sec.

The above step c is a step in which the light blocking layer is selectively exposed and developed to form the light blocking part pattern.

The selective exposure and development may be performed by using a process which is known in the art. For example, after the prebaked light blocking part material is selectively exposed by using a photomask, an exposed portion or a non-exposed portion may be developed to perform the prebaking.

It is preferable that the thickness of the manufactured light blocking part pattern be in the range of 1.1 to 5 μm and an optical density thereof be in the range of 2 to 6 within the above thickness range. Additionally, it is preferable that the above light blocking part pattern have a contact angle in the range of 20 to 60° in respects to ink.

The above step d is a step in which the above light blocking part pattern is precured.

After the above precuring step, the above step d is performed in order to prevent the uncured component of the light blocking part from being dissolved in the solution and thus being modified in the course of applying the solution.

In the above precuring step, photocuring, heat curing, or both photocuring and heat curing may be performed. In connection with this, it is preferable that the heat curing be performed at 50 to 150° for 10 to 1000 sec so that the component having the ink repellency property does not affect the pixel unit. It is preferable that the above photocuring be performed while UV is radiated in the intensity of 50 to 500 mW/cm$^2$ for 5 to 500 sec. In connection with this, since a photosensitive resin is used as the light blocking part material in the present invention, it is preferable that the precuring according to the present invention be performed by using the photocuring.

The above step e is a step in which the solution is applied on the substrate on which the above light blocking part pattern is formed.

The application of the above solution may be performed by using a typical entire surface coating process such as spin coating, slit coating, or dip coating. Since the above light blocking part pattern has the ink repellency property, when the solution is applied on the entire surface of the light blocking part pattern, the solution flows down from the light blocking part even though the solution is not subjected to a separate treatment process to be applied only on the pixel unit. The solution is vertically volatilized in the course of volatilizing the material having the ink repellency property of the light blocking part while the solution is applied on the pixel unit and subjected to the postbaking process, which functions to prevent the material having the ink repellency property of the light blocking part from affecting the pixel unit. Even though the volatilization occurs horizontally, since the volatilization is diluted due to the coating solution, the effect may be significantly reduced. FIG. 6 is a view that illustrates volatilization of the material having the ink repellency of the light blocking part during the postbake process after the solution is applied.

In connection with this, it is undesirable that the volatilization of the coated material first occurs before the material having the ink repellency property of the light blocking part is volatilized. Thus, it is preferable that the solution contain a material having the low volatility. In addition, it is preferable that the solution have a boiling point in the range of 200 to 250° C. which is similar to the temperature of the high temperature heat treatment so that the solution is volatilized at the temperature of the postbaking process in the range of 200 to 250° C. without a separate process. Furthermore, it is preferable that the solution be well mixed with ink to be applied by using inkjet. In particular, it is preferable that the solution which is the same as the solvent of the ink composition used during the inkjet process be used. This contributes to the provision of the ink affinity property when ink is discharged in the case of when the coating material remains on the pixel unit.

Specific examples of the above solution include butyl carbitol acetate (boiling point: 245° C.), diethylene glycol monoethyl ether acetate (boiling point: 217° C.), dipropyleneglycol methyl ether acetate (boiling point: 209° C.) or the like.

The above step f is a step in which the above light blocking part and the solution are subjected to the postbaking process.

The substrate on which the light blocking part pattern coated with the above solution is formed is subjected to the postbaking process at 200 to 250° C. for 10 to 200 min. The solution is vertically volatilized in the course of volatilizing the volatile material during the postbaking process, which functions to prevent the volatile material from affecting the pixel unit. During the above postbaking process, the solution which is applied in conjunction with the curing of the light blocking part may be removed, the light blocking part may have the ink repellency property, and the pixel unit may include the pattern having the ink affinity property that is the same as that of the ink.

The above step g is a step in which a pixel unit defined by the above light blocking part pattern is filled with ink.

The filling of ink may be performed by continuously using two types or more of ink, for example, three types of ink having R, G, and B colors. The above ink may be photocurable ink or heat curable ink. It is preferable that the filling of ink be performed by using an inkjet process.

If the ink is discharged onto the pixel unit by using the inkjet process, since the light blocking part pattern which is formed according to the method of the present invention has the ink repellency property and the pixel unit has the ink affinity property, the discharged ink may be uniformly dispersed in the pixel unit and applied so that the layer of ink is higher than the light blocking part pattern.

During this process, since the discharged ink does not flow over the light blocking part pattern having the ink repellency property, it is possible to continuously discharge the three types of ink while a separate post treatment process is not performed, and the photocuring or the heat curing may be performed in respects to ink after each ink is discharged or all types of ink is discharged if necessary.

In the case of the photocurable ink, after each ink is discharged or all types of ink are discharged, the exposure is performed in an exposure intensity of 40 to 300 mJ/cm$^2$, the high temperature heat curing may be performed at the temperature in the range of 200 to 250° C. for 10 to 200 min. In the case of the heat curable ink, after each ink is discharged or all types of ink are discharged, the low temperature heat curing may be performed at the temperature in the range of 50 to 150° C. for 10 to 2000 sec, and the high temperature heat curing may be performed at the temperature in the range of 200 to 250° C. for 10 to 200 min without an additional exposure process. The above-mentioned procedure may be performed in respects to ink including the heat curing type and the photocuring type mixed with each other.

The present invention provides a color filter that is manufactured by using the above method.

In the manufactured color filter, an ink affinity property of the pixel unit is maintained without a process of forming a separate ink affinity layer and a complicated surface treatment process. Thus, during the filling, it is possible to manufacture a color filter in which color mixing, discoloration, unfilling, and staining do not occur, and a surface is uniform. Furthermore, a process is simplified, contributing to a reduction in cost.

The present invention provides a display device which includes the color filter.

The display device according to the present invention may have a configuration which is known in the art, except that the display device includes the color filter according to the present invention.

[Mode for Invention]

A better understanding of the present invention may be obtained in light of the following Examples which are set forth to illustrate, but are not to be construed to limit the present invention.

Preparation Example 1

Preparation of the Light Blocking Material

Based on 1000 parts by weight of the photosensitive resin composition, 65 parts by weight of carbon black used as the coloring agent, 29 parts by weight of the copolymer of benzyl (metha)acrylate/(metha)acrylic acid (acid value 110 KOH mg/g, molar ratio 70/30, Mw=30,000) used as the alkali-soluble resin binder, 70 parts by weight of the polymer in which allylglycidyl ether was added to the copolymer of benzyl(metha)acrylate/(metha)acrylic acid (acid value 80 KOH mg/g, Mw=22,000), 50 parts by weight of dipentaerythritolhexaacrylate used as the functional monomer, 20 parts by weight of 2-benzyl-2-(dimethylamino)-1-(4-morpholinophenyl)butyl-1-one used as the photopolymerization initiator, 10 parts by weight of 2,2'-bis(o-chlorophenyl)-4,4,5,5'-tetraphenyl-1,2'-non-imidazole, 5 parts by weight of 4,4-bis(diethylamino)benzophenone, 5 parts by weight of mercaptobenzothiazole, 9 parts by weight of the polyester dispersing agent used as the additive, 1 part by weight of the fluorine surfactant used as the leveling agent for providing the ink repellency property, 440 parts by weight of propylene glycol monomethyl ether acetate used as the solvent, and 290 parts by weight of ethoxyethyl propionate were mixed with each other. Next, the mixture was agitated for 5 hours to prepare the photosensitive resin composition.

Preparation Example 2

Preparation of the Heat Curable Ink

As to the R heat curable ink which was sprayed onto the pixel units by using the inkjet process, 4.33 parts by weight of PIGMENT RED #254, 1.26 parts by weight of PIGMENT RED #177, and 0.87 parts by weight of PIGMENT YELLOW #139, which were used as the coloring agent, 3.77 parts by weight of the polymer (Mw=24,000) used as the alkali-soluble resin binder, in which allyl glycidyl ether was added to the copolymer containing benzyl(metha)acrylate and (meta)acrylic acid mixed with each other at the molar ratio of 70/30, 7.54 parts by weight of dipentaerythritolhexaacrylate used as the functional monomer, 0.5 parts by weight of the azoamide heat-curing initiator (Vam-110, Wako Pure Chemical Industries, Ltd.), 2.29 parts by weight of the polyester dispersing agent used as the additive, 1.0 parts by weight of 3-methacryloxypropyltrimethoxysilane, 0.04 parts by weight of the fluorine surfactant (Megaface F-475, Japan Ink Chemical Industry Co., Ltd., Japan) used as the leveling agent, 64.7 parts by weight of butyl carbitol acetate used as the solvent, 6.22 parts by weight of propylene glycol monomethyl ether acetate, 5.95 parts by weight of methoxy propanol, and 1.53 parts by weight of butyl cellosolve acetate were mixed with each other, and the mixture was then agitated for 5 hours to prepare the ink composition for inkjet.

Examples 1 to 3 and Comparative Examples 1 to 3

Preparation of the Color Filter

Example 1

The light blocking material which was prepared in the above Preparation Example 1 was applied on the glass substrate by using spin coating, and subjected to a preheat treatment process at about 100° C. for 2 min to form a film having a thickness of about 2.4 μm. Next, the film was cooled at room temperature, and exposed for 1 min using energy of 100 mJ/cm$^2$ by means of a photomask and a high-pressure mercury lamp. The exposed substrate was developed by using the 0.04% KOH aqueous solution at a temperature of 25° C. according to the spray process, washed with pure water, and dried by using air blowing. After the light blocking part pattern was pre-cured at 100° C. for 2 min, butyl carbitol acetate (boiling point: 245° C.) was uniformly applied on the formed glass substrate by using a dip coating process, and then subjected to a postbaking process in the convection oven at 220° C. for 30 min to cure the light blocking part pattern and to remove the coating solution.

FIG. 7 illustrates the heat curable ink which was prepared in the above Preparation Example 2 discharged on the formed light blocking part pattern (20 drops).

Example 2

The light blocking part pattern was formed by using the same method as that of the above Example 1, except that the light blocking part pattern was not precured at 100° C. for 2 min but subjected to a photocuring process by using UV energy of 100 mJ/cm$^2$ for 1 min to perform the precuring.

FIG. 8 illustrates the heat curable ink which was prepared in the above Preparation Example 2 discharged on the formed light blocking part pattern (20 drops).

Example 3

The light blocking part pattern was formed by using the same method as that of the above Example 1, except that the light blocking part pattern was not precured at 100° C. for 2 min but subjected to a heat curing process at 100° C. for 2 min and to a photocuring process by using UV energy of 100 mJ/cm$^2$ for 1 min to perform the precuring.

FIG. 9 illustrates the heat curable ink which was prepared in the above Preparation Example 2 discharged on the formed light blocking part pattern (35 drops).

Comparative Example 1

The color filter was manufactured by using the same method as that of the above Example 1, except that the application of the solution was not performed during the process of forming the light blocking part pattern.

FIG. 10 illustrates unfilling of ink after the heat curable ink was discharged.

Comparative Example 2

The color filter was manufactured by using the same method as that of the above Example 2, except that the application of the solution was not performed during the process of forming the light blocking part pattern.

FIG. 11 illustrates unfilling of ink after the heat curable ink was discharged.

Comparative Example 3

The color filter was manufactured by using the same method as that of the above Example 3, except that the application of the solution was not performed during the process of forming the light blocking part pattern.

FIG. 12 illustrates unfilling of ink after the heat curable ink was discharged.

The invention claimed is:

1. A method of manufacturing a color filter, the method comprising the steps of:
   a) applying a light blocking part material on a substrate;
   b) prebaking the light blocking part material to form a light blocking layer;
   c) selectively exposing and developing the light blocking layer to form a light blocking part pattern;
   d) precuring the light blocking part pattern;
   e) applying a solution on the substrate on which the light blocking part pattern is formed;
   f) postbaking the light blocking part and the solution; and
   g) filling ink in a pixel unit that is defined by the light blocking part pattern.

2. The method of manufacturing a color filter as set forth in claim 1, wherein in step a, the above light blocking part material includes 0.01 to 0.3 parts by weight of a silicon or fluorine surfactant based on 100 parts by weight of the light blocking part material, 20 to 50 parts by weight of a coloring agent, 20 to 50 parts by weight of a binder polymer component, and 10 to 40 parts by weight of a crosslinking agent.

3. The method of manufacturing a color filter as set forth in claim 1, wherein in step b, the prebaking of the light blocking part material is performed at 50 to 150° C. for 10 to 1000 sec.

4. The method of manufacturing a color filter as set forth in claim 1, wherein in step c, an optical density of the light blocking part pattern is in the range of 2 to 6 within a thickness range of 1.1 to 5 μm and a contact angle of the light blocking part pattern in respects to the ink is in the range of 20 to 60°.

5. The method of manufacturing a color filter as set forth in claim 1, wherein in step d, the precuring of the light blocking part pattern includes performing low temperature heat curing, photocuring, or both the low temperature heat curing and the photocuring.

6. The method of manufacturing a color filter as set forth in claim 5, wherein the low temperature heat curing is performed at 50 to 150° C. for 10 to 1000 sec.

7. The method of manufacturing a color filter as set forth in claim 5, wherein the photocuring is performed by using UV in the intensity of 50 to 500 mW/cm$^2$ for 5 to 500 sec.

8. The method of manufacturing a color filter as set forth in claim 1, wherein in step e, the applying of the solution is performed by using spin coating, slit coating, or dip coating.

9. The method of manufacturing a color filter as set forth in claim 1, wherein in step e, the solution has a boiling point in the range of 200 to 250° C.

10. The method of manufacturing a color filter as set forth in claim 1, wherein in step e, the solution is the same as a solvent that is used in an ink composition.

11. The method of manufacturing a color filter as set forth in claim 1, wherein in step e, the solution is butyl carbitol acetate, diethylene glycol monoethyl ether acetate, or dipropyleneglycol methyl ether acetate.

12. The method of manufacturing a color filter as set forth in claim 1, wherein in step f, the postbaking of the light blocking part and the solution is performed at 200 to 250° C. for 10 to 200 min.

13. The method of manufacturing a color filter as set forth in claim 1, wherein in step g, the filling of the ink includes simultaneously or continuously filling two types or more ink.

14. The method of manufacturing a color filter as set forth in claim 1, wherein in step g, the filling of the ink is performed by using an inkjet process.

15. The method of manufacturing a color filter as set forth in claim 1, wherein in step g, the ink is a photocurable or heat curable ink.

* * * * *